US006980224B2

(12) United States Patent
Wiant, Jr.

(10) Patent No.: US 6,980,224 B2
(45) Date of Patent: Dec. 27, 2005

(54) EFFICIENT DIGITAL MAP OVERLAYS

(75) Inventor: Kenneth J. Wiant, Jr., Viera, FL (US)

(73) Assignee: Harris Corporation, Melbourne, FL (US)

(*) Notice: Subject to any disclaimer, the term of this patent is extended or adjusted under 35 U.S.C. 154(b) by 106 days.

(21) Appl. No.: 10/106,644

(22) Filed: Mar. 26, 2002

(65) Prior Publication Data
US 2003/0184563 A1 Oct. 2, 2003

(51) Int. Cl.[7] .............................................. G09G 5/00
(52) U.S. Cl. ..................................................... 345/629
(58) Field of Search ................................ 345/629–634

(56) References Cited

U.S. PATENT DOCUMENTS

| 4,970,682 A | | 11/1990 | Beckwith, Jr. et al. ......... 707/1 |
|---|---|---|---|
| 5,621,869 A | * | 4/1997 | Drews ......................... 345/634 |
| 6,104,407 A | * | 8/2000 | Aleksic et al. .............. 345/428 |
| 6,522,341 B1 | * | 2/2003 | Nagata ....................... 345/639 |

* cited by examiner

Primary Examiner—Sumati Lefkowitz
Assistant Examiner—Motilewa Good-Johnson
(74) Attorney, Agent, or Firm—Sacco & Associates, PA

(57) ABSTRACT

In a graphics processing system utilizing a graphics interface that defines each color fragment using at least one color fragment characteristic component, a method and system for more efficient display of a graphic overlay. The method can comprise for each color fragment in a map scene, defining the color fragment characteristic component value based on a location characteristic associated with a location on the map, setting a test value, and comparing the color fragment characteristic component value for each color fragment in the map scene to the test value to determine whether the color fragment should be displayed in an overlay color.

20 Claims, 4 Drawing Sheets

EFFICIENT DIGITAL MAP OVERLAYS

BACKGROUND

1. Technical Field

The invention concerns digital map overlays, and more particularly a method and system for more efficiently producing digital map overlays with reduced processing overhead.

2. Description of the Related Art

Graphical overlays are a desirable feature that can be displayed in conjunction with a moving digital map. These graphical overlays can display important information that is helpful for a user of the map. For example, Height Above Terrain (HAT) and Threat Intervisibility (TIV) are graphical overlay layers used in digital moving maps. HAT is typically represented by a colored region on a map that indicates terrain that is above the current altitude of the aircraft. This is useful for a pilot to indicate which terrain can safely be traversed at their current height. TIV is also commonly represented by a colored region on a digital map. In the case of TIV, however, the colored region indicates that a threat (Radar, SAM site, etc.) can see a particular location at the aircraft's current altitude.

Typically the colored layers comprising a graphical overlay are electronically draped over the top of another by selectively controlling the appearance of pixels or color fragments. This display technique can create a view of the region for the user that is similar to a satellite image of the area, a paper chart, or slope shaded terrain relief. Although such presentation techniques can be very helpful for a user to visualize important features of a particular area, performing the necessary calculations and transferring the patterns to image memory are very time consuming operations. As the scene memory grows in size, these calculations take more time, and more time is needed to load the images into video memory. Consequently, a user can sometimes be required to wait a considerable period of time while the data is calculated and displayed.

The word "post" is commonly used to refer to a point on an image that has an associated description, such as elevation or color. For example, a color fragment is a kind of post that is described by color. To generate the HAT layer, the digital map application must create an overlay image and parse through the elevation data for the current geographic area. To decide if a post is painted or clear, it must compare each elevation post to the current altitude of the aircraft. If the post is greater that the aircraft elevation, then that post must be painted, otherwise it is left clear. A painted post is simply set to some desired color to indicate the terrain is above the aircraft. When this process is done for the entire scene, it can be displayed as the HAT overlay. This process must be repeated anytime the aircraft changes altitude. Usually a threshold is set so that the aircraft must move some fixed amount before this costly calculation is performed.

As another example, it is helpful to consider the processing necessary to generate the TIV layer, the digital map application must first generate a mask (How-Hi mask) that represents a threat pattern. In other words, a new matrix of elevation values is created using user defined threat characteristics. A suitable algorithm can be used to generate a pattern that represents the altitude at each post that an aircraft must be below in order to remain invisible to all threats. Using this information, a pattern is generated that can be used as a new elevation source data. To generate the actual overlay layer, the application must create a new overlay image and perform the same post-by-post comparison as for the HAT layer, except that the post is painted if the source elevation post is below the aircraft's elevation.

The How-Hi mask described above only needs to be updated when the scene moves (and needs to load new elevation source data) or if the user changes the threat characteristics. However, the overlay layer must be recalculated any time the aircraft changes altitude. The combination of all these calculations can be very processor and memory intensive.

One consequence of the foregoing is that conventional systems require a threshold to be programmed into the system such that the aircraft must change elevation by at least the threshold amount before the HAT and TIV overlays are recalculated. Otherwise, the system would constantly be updating the overlays. If the elevation is changing faster than the calculations could be performed (which is generally the case) then the user would never see the changes. This is a problem because the threshold presents a performance limitation.

A variety of commercial off the shelf (COTS) tools are currently available to simplify and standardize the design and development computer graphics display systems. One such tool is the OpenGL Graphics Interface. OpenGL is a well known 3D graphics API (Application Programmer's Interface) that is intended to provide a simple, direct interface to the fundamental operations of 3D graphics rendering. The Open GL API eases the task of writing graphics programming by eliminating the need to write a distinct graphics driver for each platform on which a particular application is to be run. OpenGL is now considered an industry standard and is supported by nearly all COTS video cards. Another common graphics API is DirectX, which is available from Microsoft Corporation of Redmond, Wash.

While the availability of OpenGL and COTS video cards hold much promise for future reductions in cost and complexity of computer graphics systems, they also present certain problems. For example, COTS video cards may not have as much processing capability or video memory as might otherwise be desirable for performing certain functions, such as the display of overlays on moving digital maps. Accordingly, there is a need to find innovative ways to adapt such existing COTS hardware and API's to perform these tasks while remaining within their performance limitations.

SUMMARY OF THE INVENTION

The invention concerns a method for more efficient display of a graphic overlay In a graphics processing system. More particularly, in a graphics processing system utilizing a graphics interface that defines each color fragment using at least one color fragment characteristic component, the process includes defining for each color fragment in a map scene, a color fragment characteristic component value based on a location characteristic associated with a location on said map; setting a test value; and comparing the color fragment characteristic component value for each color fragment in the map scene to the test value to determine whether the color fragment should be displayed in an overlay color.

According to one aspect of the invention, the location characteristic can be a physical feature of the location such as an elevation of the location. The method can further include the step of determining the location characteristic indirectly using an algorithm to compute a set of graphic overlay source data. For example, the graphic overlay source data can be computed based on a location of a user within the map scene. The location of the user for this purpose can be at least partially based on an altitude.

The process also involves determining a test value based on an overlay display criterion. For example, the overlay display criterion can be an altitude of an aircraft. Using the techniques and processes of the present invention has the further advantage of permitting the overlay color to be determined at draw time rather than.

The invention also concerns a graphics processing system that uses a graphics interface that defines each color fragment using at least one color fragment characteristic component. Graphics processing capabilities are provided for assigning each color fragment in a map scene a color fragment characteristic component value based on a location characteristic associated with a location on the map; for setting a test value; and for comparing the color fragment characteristic component value for each the color fragment in the map scene to the test value to determine whether the color fragment should be displayed in an overlay color.

DETAILED DESCRIPTION OF THE PREFERRED EMBODIMENTS

Figure 1:
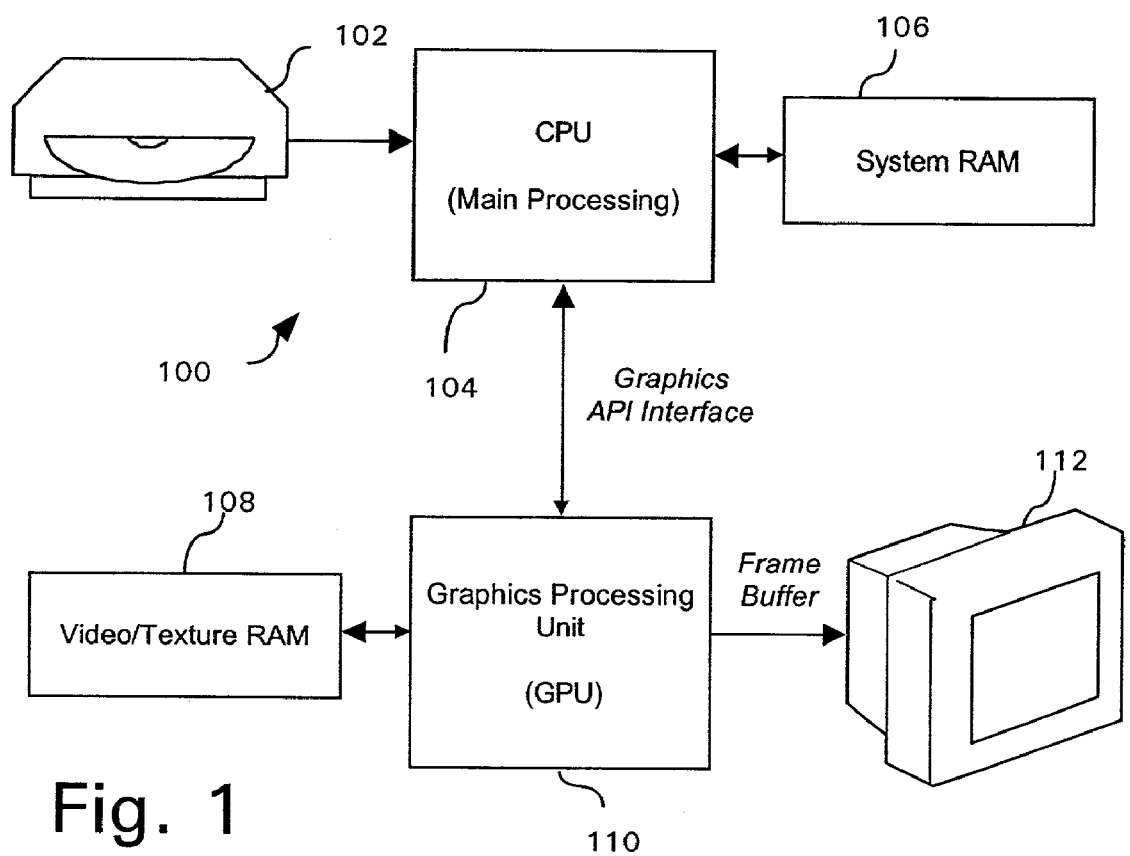
FIG. 1 is a block diagram of a graphics processing system that can be used in accordance with the inventive arrangements.

FIG. 1 is a block diagram of graphics processing system. The system 100 can include a mass data storage unit 102 that can be used for storing a database of digital map data. Mass storage unit 102 can be any of a wide variety of commercially available devices for storing large quantities of digital data. For example a magnetic hard drive, a CD ROM drive, a DVD drive or electronic data storage medium can be used for this purpose.

CPU 104 can access the mass data storage unit 102, and the digital map data stored thereon so that digital map data selected by a user can be presented on display unit 112. System RAM 106 is provided for temporarily storing map data, application software and API's (Application Programming Interfaces) as may be required by CPU 104. A graphics-processing unit (GPU) 110 is preferably provided to perform selected processing functions associated with rendering of digital maps. CPU 104 can communicate with the GPU 110. A video/texture RAM can be provided for GPU 110 to temporarily store image data and other information associated with processing performed by GPU 110. Image data can be communicated to display unit 112 via a suitable interface that can preferably include a frame buffer memory (not shown).

According to one aspect of the invention, it can be convenient to make use of a graphics API to aid CPU 104 in managing image processing tasks and communicating with GPU 110. Suitable graphics API's that can be used for this purpose are well known in the art. For example, OpenGL and DirectX are supported by many commercially available GPU's and can each be used for this purpose. However, the invention is not limited in this regard and any other suitable interface can also be used.

Figure 2:
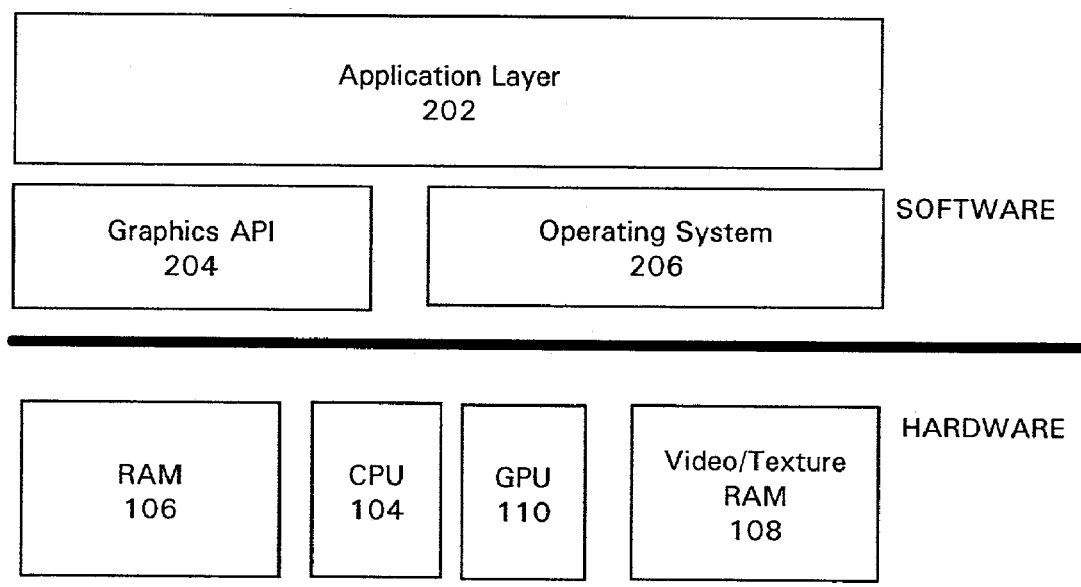
FIG. 2 is a conceptual hardware and software system block diagram that is useful for understanding the inventive arrangements.

FIG. 2 is a drawing that is a conceptual hardware and software block diagram that is useful for understanding the role of a graphics API in the inventive arrangements. As previously described relative to FIG. 1, the system can include RAM, 106, CPU 104, GPU 110 and video/texture RAM 108 at the hardware level. An operating system 206 is preferably provided for hosting the application 202. The operating system can be any of a variety of well known conventional operating systems such as the WindowsNT family of operating systems available from Microsoft Corporation of Redmond, Wash. Graphics API 204 can be provided as shown for providing an interface between GPU 110 and CPU 104. The application layer 202 in this case can be a digital map presentation application designed for dynamic presentation of digital maps and graphical overlays.

Figure 3:
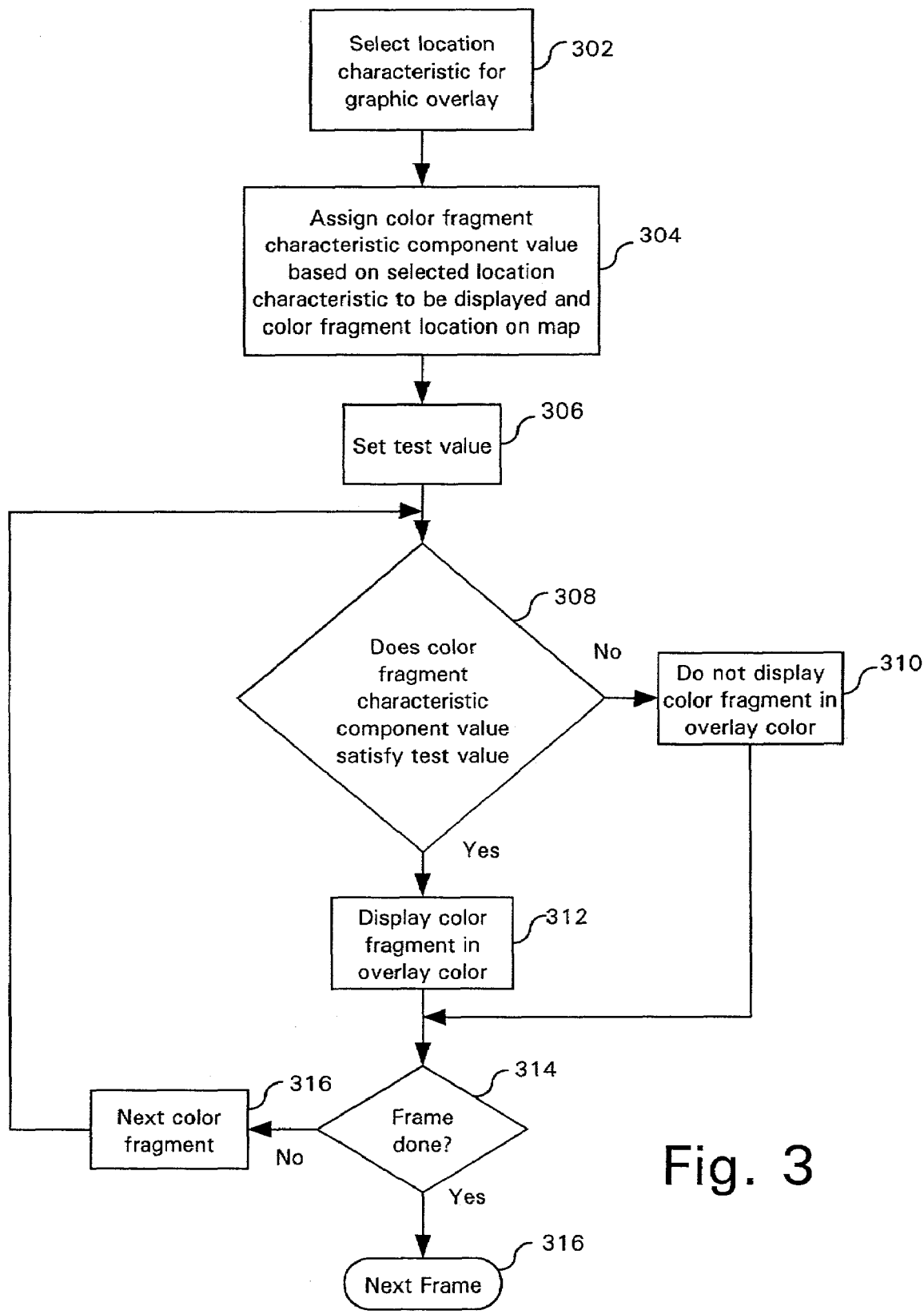
FIG. 3 is a flow chart that is useful for illustrating a graphical overlay process in accordance with the inventive arrangements.

FIG. 3 is a flow chart that is useful for illustrating a process for more efficiently generating and displaying a graphical overlay. The process can begin in step 302 based on a user selection of a desired location characteristic to be presented in the form of a graphical overlay. The location characteristic can be any characteristic that can be associated with a location on a digital map. One example of a location characteristic would be any terrain that is above the current altitude of an aircraft. This is useful information for a pilot to indicate which terrain can safely be traversed at an aircraft's current altitude. Another example of a location characteristic could be based on whether a threat, such as a radar or missile site, can see a particular map location at the aircraft's current altitude. Other location characteristics can be geological formations, oil and mineral deposits, air pollutants, and any other characteristic associated with a particular map location.

Once the location characteristic for the overlay has been selected in step 302, the system can in step 304 assign a characteristic component value for each color fragment to be displayed in a scene. In a computer graphics system, it is conventional to define the characteristics of each color fragment to be displayed using one or more color fragment characteristic component values. For example, a color fragment can be defined based on color fragment characteristic component values specifying the amount of red, green and blue color to be displayed at a particular display screen location. A fourth commonly used color fragment characteristic component value is an amount of transparency or opacity associated with a particular color fragment. This fourth color fragment characteristic component is sometimes referred to as the Alpha component. When one color fragment is drawn on top of another, the value of the Alpha component can be used to selectively blend the two colors together.

According to a preferred embodiment of the present invention, the color fragment characteristic component value can be selectively determined in step 304 based on a location characteristic to be displayed and the location of the color fragment relative to the digital map. For example, in the case of an HAT overlay showing the location of terrain above the current altitude of an aircraft, the color fragment characteristic component value can be a normalized value directly based on the geographic elevation of a particular location on the digital map. In this case, the source data (elevation) can be directly available from the digital map.

For other types of overlays, additional processing can be required in order to generate the source data. For example, in the case of a TIV overlay, it may be necessary to make use of a suitable algorithm to generate source data indicating the altitude at which an aircraft in a particular map location would be visible to threats based on a set of known threat characteristics. The color fragment characteristic component values could then be a determined based on this source data. In particular, the normalized values for the color fragment characteristic component values can be calculated based on the altitudes computed using the selected algorithm.

Those skilled in the art will readily appreciate that while the exemplary source data as described herein has been directly or indirectly related to altitude, the invention is not so limited. Instead, the source data could be based on any location characteristic associated with a particular map coordinate, provided that the source data is normalized to a suitable test value as shall hereinafter be described.

In step 306, the system can set a test value against which color fragment characteristic component values assigned in step 304 can be compared. The test value is preferably a normalized value that can be used as a standard against which the color fragment characteristic component values can be compared to determine whether a particular color fragment will be displayed in an overlay color. For example, in the case of an HAT overlay, the test value will be a normalized value based on the current altitude of an aircraft. This normalized altitude can be compared to color fragment characteristic component values representing normalized elevation data for particular map locations. In the case of TIV data, the test value can similarly be based on the normalized aircraft altitude.

In step 308, the color fragment characteristic component value from step 304 is compared to the test value from step 306 to determine whether the color fragment should be displayed in the overlay color. Notably, this test process can be conveniently facilitated by conventional graphics API's, such as OpenGL and DirectX, that incorporate an Alpha Test or similar function. As noted above, the alpha value is normally used to define a degree of transparency that is used, for example, when two colors are to be blended together. The Alpha Test function is conventionally used to discard an incoming color fragment if the alpha value is under a certain threshold. This is intended to speed up rendering by throwing out color fragments that are almost totally transparent, and would not be seen easily anyway.

For the purposes of the present invention, the Alpha Test function can be used in step 308 to compare the color fragment characteristic component value to the test value. Further, by setting the blend function to a constant value as hereinafter described, the color fragment can be either blended or discarded. Accordingly, the color fragment can either be displayed in step 312 or discarded (not displayed) in step 310. In either case, the system checks in step 314 to determine whether all color fragments in a frame have been processed. If not, then the system loops back to step 308 to process the next color fragment in the overlay. If there are no more color fragments to be processed, then the system proceeds to the next frame in step 316.

The foregoing process takes advantage of existing alpha testing functions that are available in conventional graphics API's. In doing so, it offers significant advantages over the prior art since the overlay is automatically updated whenever the altitude changes. This method removes the need for pre-set thresholds that must be exceeded before an overlay is redrawn in conventional systems, and allows the user to see the overlay changes as soon as they occur. The process also speeds up rendering by not drawing color fragments that are not visible and reduces by 75% the amount of memory required for graphical overlay processing. This approach will also allow digital map overlays to be efficiently implemented using COTS graphics cards that are compliant with common graphics API's such as OpenGL and DirectX.

A significant benefit of the foregoing method is seen when the OpenGL Imaging Subset is supported (in the case of OpenGL), it being understood that alternative API's can have similar capabilities. The Imaging Subset is an extension to OpenGL that is present if the GL__ARB__imaging token is defined. It provides additional color fragment processing capabilities. If the Imaging Subset is present, it allows the application to set a constant blending color, instead of just GL__ONE (see the example code below).

A brief explanation of blending is useful for understanding the further advantages achieved with the present invention when the Imaging subset is present. A blending function, if provided, can allow an application program to tell an API how to blend two overlapping color fragments. In the case of OpenGL, the function is accessed as glBlendFunc(). In a situation where It is desired to draw a blue color fragment (source) on top of a red color fragment (destination, meaning the color fragment is already in the frame buffer) and the blend ratio can be set, for example, as 0.75 (source) and 0.25 (destination). In this case, the resulting color fragment that will replace the destination color fragment is 0.75*Blue+0.25*Red. To understand the importance of the added control over the blending function in the present invention, it is helpful to consider the following section of code:

EXAMPLE 1

```
// Enable OpenGL States
glEnable(GL__BLEND):
glEnable(GL__ALPHA__TEST);
// Set the Blending Function
glBlendFunc(GL__ONE, GL__ZERO);
glAlphaFunc(GL__GEQUAL, THRESHOLD);
```

This section of code in Example 1 is arranged so that if the incoming fragment (e.g. color fragment) passes the Alpha Test, it is blended into the fragment that already exists at that location. The Blend Function tells the GPU 110 how to blend the fragment. In this instance, GL__ONE is assigned for the source and GL__ZERO for the destination. This means that the blended fragment is equal to one times the incoming or source fragment (the overlay color) plus zero times the current fragment (existing map color). This means that if the Alpha Test is passed, the fragment will be drawn with the overlay color, otherwise it remains unchanged.

The Imaging Subset allows the system to specify a constant blending color instead of just a ONE or ZERO factor. This means that the overlay color can be set at the time it is drawn instead of when the layer is generated. This also means that a constant Alpha will be used to blend (if the fragment passes the Alpha Test). To take advantage of this feature, the code would change to the following:

EXAMPLE 2

```
// Enable OpenGL States
glEnable(GL__BLEND);
```

```
glEnable(GL_ALPHA_TEST);
// Set the Blending Function
glBlendFunc(GL_CONSTANT_COLOR,
    GL_ONE_MINUS_CONSTANT_ALPHA);
glBlendColor(m_fRed, m_fGreen, m_fBlue, m_fAlpha);
glAlphaFunc(GL_GEQUAL, THRESHOLD);
```

With the code shown in Example 2, if the incoming fragment passes the Alpha Test, it is blending with a constant color (which includes a constant alpha). The new fragment would be:

Red=Constant Red+((1.0−Constant Alpha)* Destination Red);

Green=Constant Green+((1.0−Constant Alpha)* Destination Green);

Blue=Constant Blue+((1.0−Constant Alpha)* Destination Blue);

If the Constant Color has an Alpha of ONE, then the result in Example 2 will look exactly like the output of the code in Example 1. However, if the Constant Color in Example 2 has some fractional Alpha value, say 0.50, then the overlay color would be blended with 50% transparency and the user would be able to see the underlay through the overlay layer. This is also possible in the first case (no Imaging Subset) by setting the Blend Function to GL_SRC_ALPHA and GL_ONE_MINUS_SRC_ALPHA. However, using the Imaging Subset offers two major advantages.

One advantage is reduced memory usage. Since the overlay color is selected when the texture is actually drawn, the texture can be stored with the Alpha information only. For example in a 32-bit color fragment, 8 bits are conventionally used to represent each of the Red, Green, Blue and Alpha components. If the overlay color were selected only when the overlay is actually drawn, then a total of only 8 bits would need to be stored since only the value for Alpha would need to be represented. Similarly, in the case of a 64-bit color fragment, where the Red, Green, Blue and Alpha components are each conventionally represented with 16 bits, only a 16-bit alpha value would be required. The result is that it is possible to obtain the same texture sizes as in Example 1 except that color tables (which are 0.5 MB in the 64-bit color case) are no longer required. Consequently, the Imaging Subset offers the smallest video memory footprint.

A second advantage of using the Imaging Subset is that the user can change the overlay color instantly. Where the Imaging Subset is used, the color is only determined at draw time. Consequently, if the user changes the color, it would be drawn with the new color in the very next frame. By comparison, in case of the code shown in Example 1, each color table would have to be reloaded, and in the default case, the entire image would have to be regenerated in the event of a new overlay color.

Using the Alpha channel (or any other color fragment component characteristic) to represent real-world elevations allows digital map applications using OpenGL to improve performance. This is accomplished by eliminating the need to regenerate an entire scene's worth of data when the aircraft's elevation changes. Using the Alpha Test will also speed up the drawing time of the overlay, since un-necessary fragments will be discarded. If the rendering hardware supports either Paletted Textures as described in Example 1 (which is very common, and useful in it's own right), or the Imaging Subset as described relative to Example 2 (which is an OpenGL Architecture Review Board approved extension) then the amount of memory needed is drastically reduced. If the Imaging Subset is supported, the ability to change the overlay color is added. The color can be updated at the same time as the elevation, and requires no extra time to render.

Figure 4:
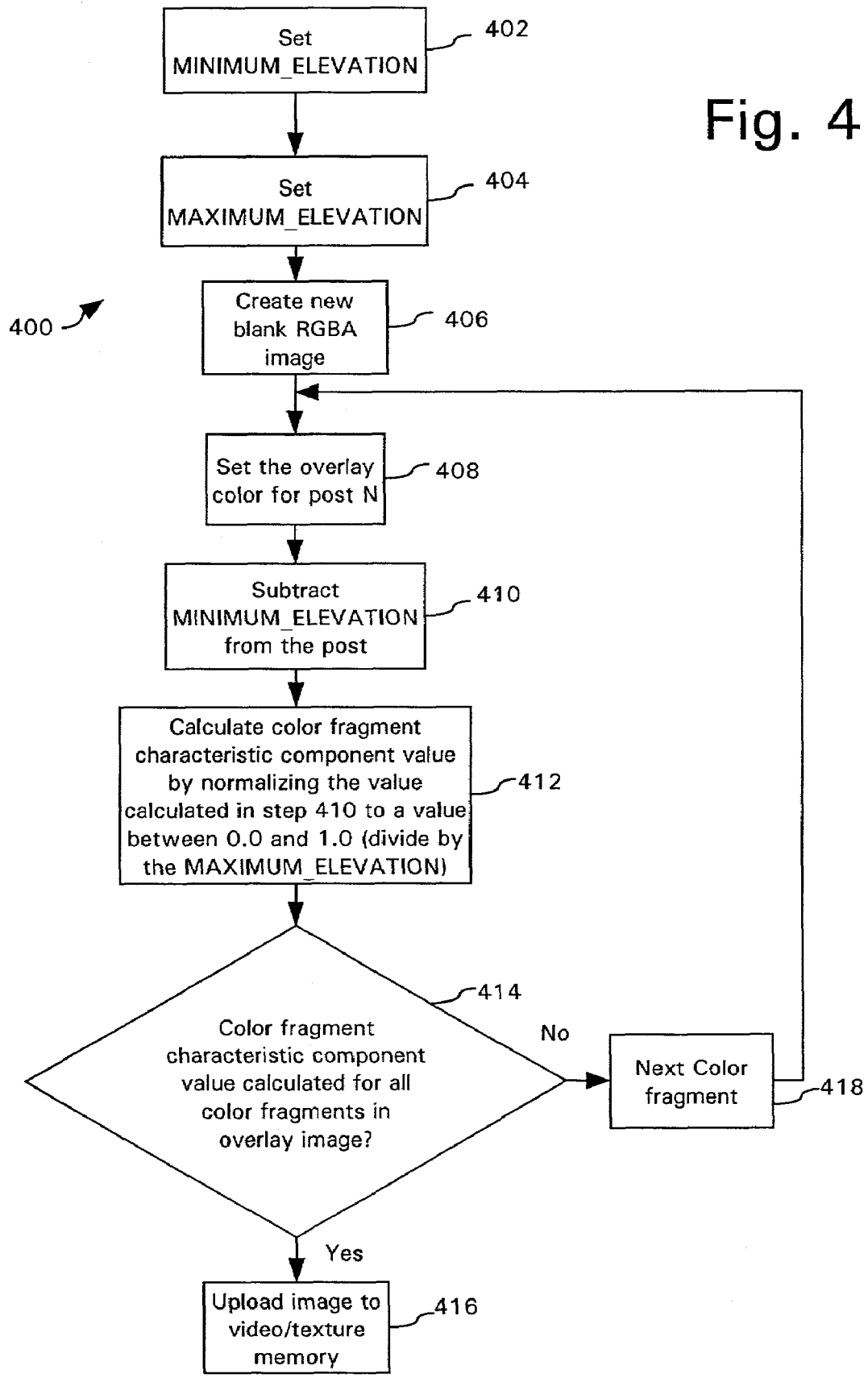
FIG. 4 is a flow chart useful for illustrating an exemplary process for creating an HAT overlay.

FIG. 4 is a flow chart 400 useful for illustrating an exemplary process for creating an HAT overlay, it being understood that the invention is not so limited. The process can begin at step 402 by setting a MINIMUM_ELEVATION value. This value would currently be −418 m, in Jordan. In step 404, the system can set a MAXIMUM_ELEVATION value, would normally be 8850 m at Mt. Everest minus the MINIMUM_ELEVATION value from step 402. In step 406, a new blank RGBA image is created that can be used as the overlay. In step 408, the overlay color for post N is set in accordance with a user selection.

In steps 410 and 412, the color fragment characteristic component value is set. In accordance with a preferred embodiment, the color fragment characteristic component value can be assigned as the Alpha component of an RGBA color fragment. In step 410, the MINIMUM_ELEVATION is subtracted from the actual elevation corresponding to a particular location of a color fragment on a map. The color fragment characteristic component value can then be calculated by normalizing the difference value calculated in step 410 to a value between 0.0 and 1.0. This can be accomplished by dividing the difference value in step 410 by the MAXIMUM_ELEVATION value.

In step 414, the system checks to see if the color fragment characteristic component value has been calculated for each color fragment in the overlay image. If not, the system processes the next color fragment in step 418 and loops back to step 408. If all color fragments have been processed, the image is uploaded to video/texture memory in step 416.

Figure 5:
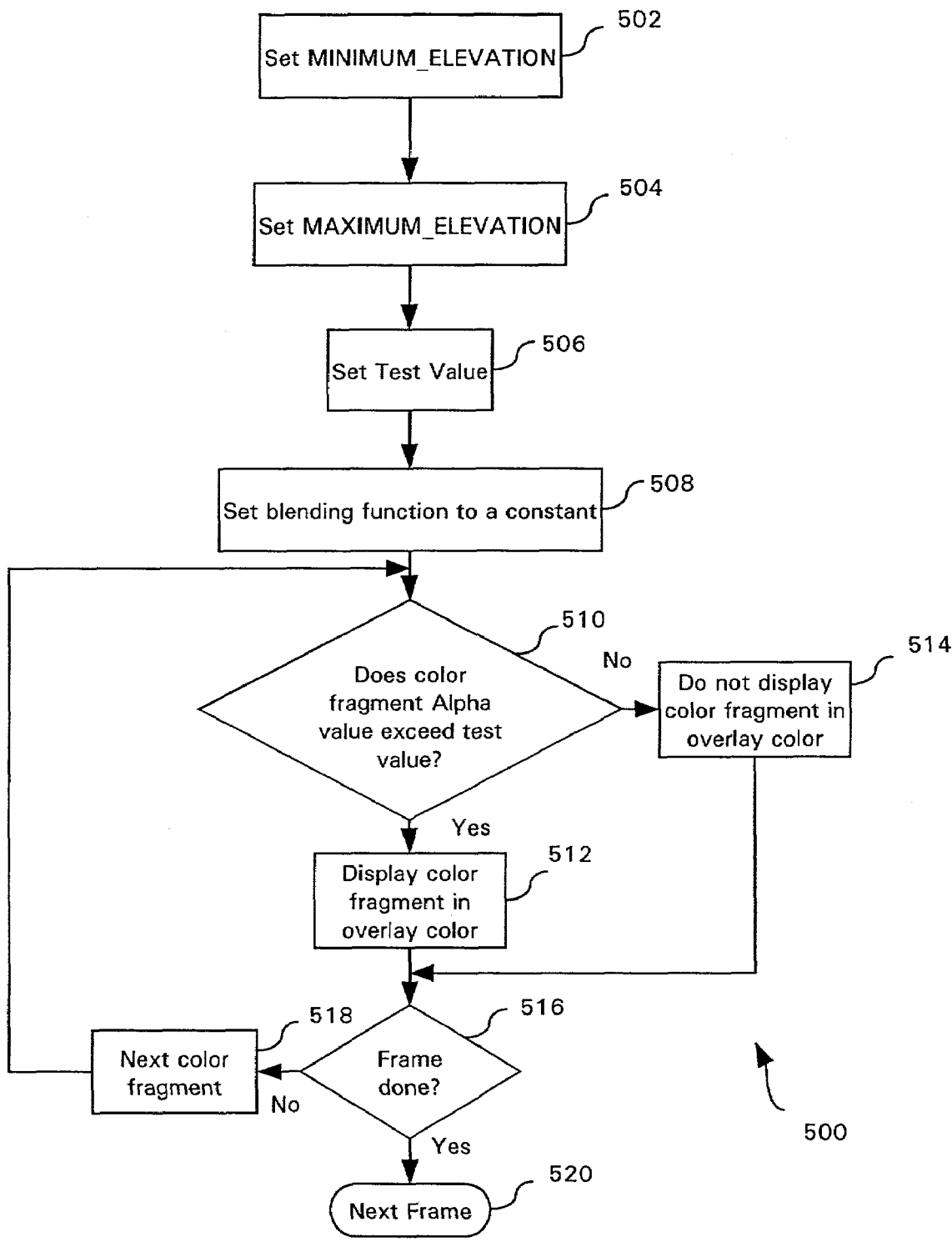
FIG. 5 is a flow chart useful for illustrating an exemplary process for drawing an HAT overlay.

FIG. 5 is a flow chart 500 useful for illustrating an exemplary process for drawing an HAT overlay that has been created as described previously relative to FIG. 4. The drawing process can begin in step 502 by setting a MINIMUM_ELEVATION value. The MINIMUM_ELEVATION value would typically be −418 m in Jordan, as noted above. In step 504, the MAXIMUM_ELEVATION value would be set typically 8850 m (at Mt. Everest) minus the MINIMUM_ELEVATION.

In step 506, a test value is set. According to a preferred embodiment, the test value as referred to herein can be an Alpha Test value as an Alpha Test function is commonly provided by existing graphics API's. The test value can be determined by subtracting the MINIMUM_ELEVATION from the aircraft's current elevation. The difference is preferably normalized to a value between 0.0 and 1.0. For example this could be accomplished by dividing by the MAXIMUM_ELEVATION (8850 m at Mt. Everest), or some other normalizing value. In step 508, the blending function is set to a constant. This is done so that a predetermined blending value can be used rather than using each color fragment's actual alpha value (which in this application represents altitude).

In the case of the HAT overlay, it is desired to display an overlay color only at those locations where the geographic elevation exceeds the current altitude of the aircraft. Accordingly, in step 510, the system can use the test function (in this case the Alpha Test Function) to determine for each color fragment whether the Alpha value is greater than or equal to the test value (Alpha). If so, then in step 512 the color fragment is drawn in the frame buffer using the overlay color. If not, then in step 514, color fragment is not drawn in the overlay color. In step 516, the system checks to see if all of the color fragments for the frame have been processed.

If so, the system goes on to process the next frame in step 520. Otherwise, the system goes on to the next color fragment in step 518 and loops back to step 510.

A similar approach to that show in FIGS. 4 and 5 could also be used for drawing a TIV overlay. However, in the TIV case, it is preferred that the MAXIMUM_ELEVATION value be set to some value that defines the highest possible elevation the aircraft can attain. Also, in the TIV case, the Alpha Test function would preferably be set to check for values less than the Alpha Test value. Finally, the TIV case would typically require a source data elevation set based on threat intervisibility as opposed to simple elevation data that can be used in the HAT overlay.

What is claimed is:

1. In a graphics processing system utilizing a graphics interface that defines each color fragment using at least one color fragment characteristic component, a method for more efficient display of a graphic overlay, comprising:

for each color fragment in a map scene that charts a geographic area of the physical world, defining said color fragment characteristic component value based on a location characteristic;

selecting said location characteristic to be an attribute associated with said geographic location illustrated on said map scene;

setting a test value;

comparing said color fragment characteristic component value for each said color fragment in said map scene to said test value to determine whether said color fragment should be displayed in an overlay color.

2. The method according to claim 1 wherein said location characteristic is a physical feature of said location.

3. The method according to claim 2 wherein said location characteristic is an elevation of said location.

4. The method according to claim 1 further comprising the step of determining said location characteristic indirectly using an algorithm to compute a set of graphic overlay source data.

5. The method according to claim 4 further comprising computing said graphic overlay source data based on a location of a user within said map scene.

6. The method according to claim 5 further comprising the step of defining said location of said user is at least partially based on an altitude.

7. The method according to claim 1 further comprising the step of determining said test value based on an overlay display criterion.

8. The method according to claim 7 wherein said overlay display criterion is an altitude of an aircraft.

9. The method according to claim 1 further comprising the step of determining said overlay color at draw time.

10. In a graphics processing system utilizing a graphics interface that defines each color fragment using at least one color fragment characteristic component, a method for more efficient display of a graphic overlay, comprising:

for each color fragment in a map scene that charts a geographic area of the physical world, defining said color fragment characteristic component-value based on a corresponding elevation associated with a geographic location illustrated on said map scene;

comparing said color fragment characteristic component value for each said color fragment in said map scene to a test value to determine whether said color fragment should be displayed in an overlay color.

11. A graphics processing system comprising:

a graphics interface that defines each color fragment using at least one color fragment characteristic component;

means for assigning each color fragment in a map scene that charts a geographic area of the physical world a color fragment characteristic component value based on a location characteristic associated with a geographic location illustrated on said map, said location characteristic describing an attribute associated with said geographic location;

means for setting a test value; and means for comparing said color fragment characteristic component value for each said color fragment in said map scene to said test value to determine whether said color fragment should be displayed in an overlay color.

12. The system according to claim 11 wherein said location characteristic is a physical feature of said location.

13. The system according to claim 12 wherein said location characteristic is an elevation of said location.

14. The system according to claim 11 wherein said means for assigning determines said location characteristic indirectly using an algorithm to compute a set of graphic overlay source data.

15. The system according to claim 14 wherein said means for assigning computes said graphic overlay source data based on a location of a user within said map scene.

16. The system according to claim 15 wherein said location of said user is at least partially defined by an altitude.

17. The system, according to claim 11 wherein said means for setting determines said test value based on an overlay display criterion.

18. The system according to claim 11 wherein said overlay display criterion is an altitude of an aircraft.

19. The system according to claim 11 wherein said overlay color is determined at draw time.

20. A graphics processing system comprising:

a graphics interface that defines each color fragment using at least one color fragment characteristic component, a method for more efficient display of a graphic overlay;

processing means for assigning each color fragment in a map scene that charts a geographic area of the physical world a color fragment characteristic component value based on a corresponding elevation associated with a geographic location illustrated on said map scene;

comparing means for comparing said color fragment characteristic component value for each said color fragment in said map scene to a test value to determine whether said color fragment should be displayed in an overlay color.

\* \* \* \* \*